J. B. JOHNSON.
FILM WINDING MECHANISM FOR KINETOSCOPES.
APPLICATION FILED FEB. 19, 1909.
978,454.
Patented Dec. 13, 1910.
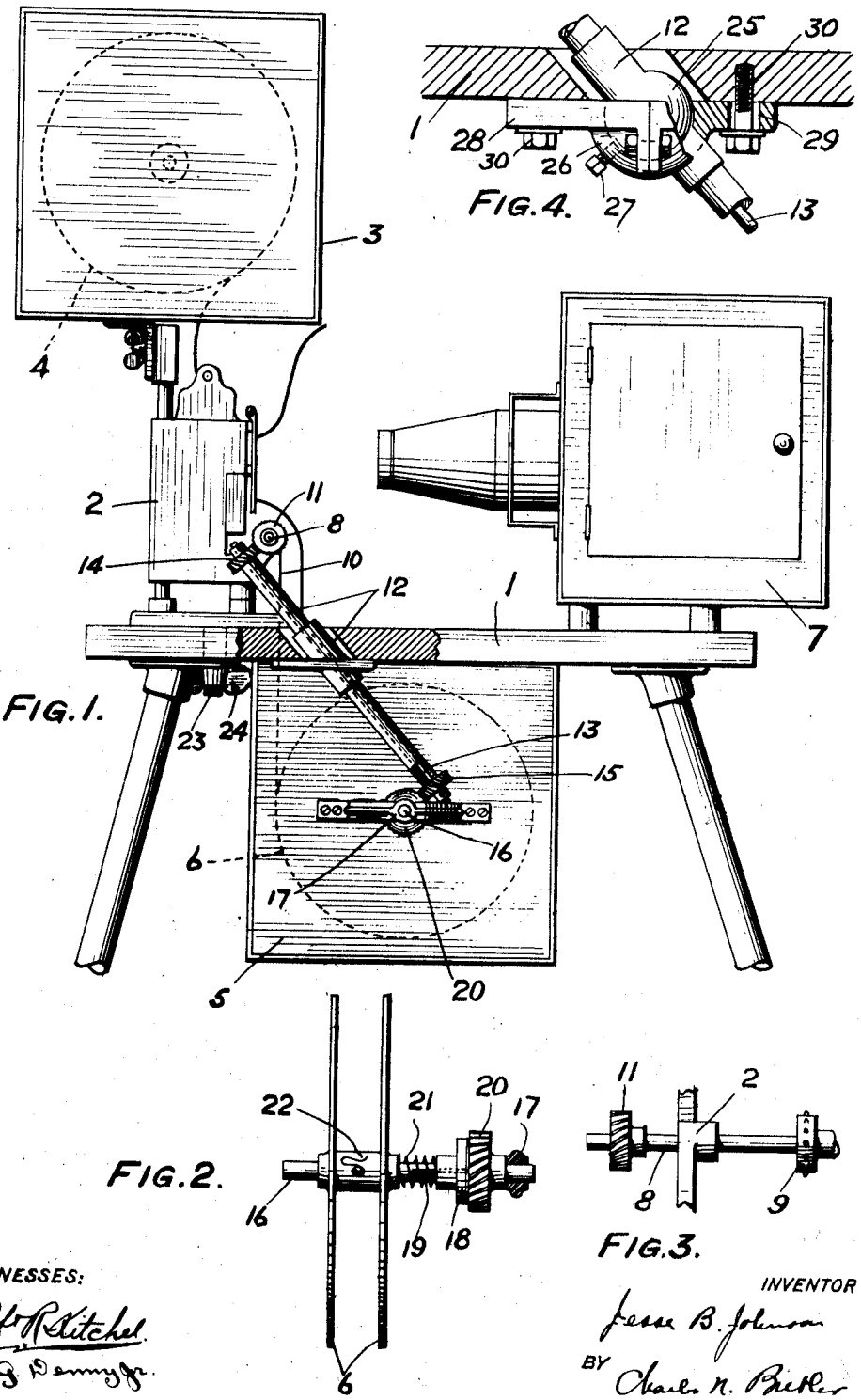

UNITED STATES PATENT OFFICE.

JESSE B. JOHNSON, OF PHILADELPHIA, PENNSYLVANIA, ASSIGNOR TO SIEGMUND LUBIN, OF PHILADELPHIA, PENNSYLVANIA.

FILM-WINDING MECHANISM FOR KINETOSCOPES.

978,454.  Specification of Letters Patent.  Patented Dec. 13, 1910.

Application filed February 19, 1909. Serial No. 478,780.

*To all whom it may concern:*

Be it known that I, JESSE B. JOHNSON, a citizen of the United States, residing in the city of Philadelphia, county of Philadelphia, and State of Pennsylvania, have invented certain Improvements in Film-Winding Mechanism for Kinetoscopes, of which the following is a specification.

My invention relates to improvements in film winding mechanism connected with the mechanism which feeds the film through the kinetoscope.

The leading object of my improvements is to provide a simple, compact, efficient and noiseless mechanism operated by operating the kinetoscope, for taking up the film delivered from the kinetoscope. To this end, I preferably journal a shaft in a bearing supported by the table which supports the kinetoscope and the magazine containing the take up reel, and connect this shaft by spiral or helical gears with a shaft of the kinetoscope's film feeding mechanism and the shaft carrying the reel, the reel being connected up by mechanism permitting it to revolve at a variable rate with reference to the rate of the driving gear connected therewith.

The characteristic features of my improvements will fully appear in the following description and the accompanying drawings in illustration thereof.

In the drawings, Figure 1 is a side elevation, partially in section, of apparatus embodying my invention; Fig. 2 is a view of the take up reel with its shaft and the means for operating it; Fig. 3 is a view of the sprocket shaft by which the take up mechanism is operated; and Fig. 4 is a sectional view of a modified construction for supporting the shaft through which the kinetoscope operates the reel.

The apparatus shown in the drawings comprises a table 1, a projecting kinetoscope 2 thereon, a film magazine 3 containing the supply reel 4 carried by the kinetoscope, a film magazine 5 containing the take up reel 6 carried by the table beneath the kinetoscope, and the lantern 7 carried by the stand.

The kinetoscope has on the revoluble shaft 8, provided with the bottom sprockets 9 for discharging the film 10, a spiral or helical gear 11. In a tubular bearing 12, extending through and carried by the table, is journaled a shaft 13 having the spiral or helical gears 14 and 15 fixed on the respective ends thereof; the gear 14 being engaged by the gear 11 and the shaft 13 revolved thereby.

A shaft 16, journaled in bearings 17 of the magazine 5, has fixed thereon the reel 6 and longitudinally movable thereon the friction disk 18, the disk being attached to the shaft by the spline 19. A spiral or helical gear 20 is placed on the shaft in engagement with the gear 15, between the bearing 17 and the disk 18, and a coiled spring 21 is disposed on the shaft between the reel and the disk, pressing the latter against the spiral gear which is frictionally engaged to the shaft thereby.

The film 10 being passed over the sprockets 9 into the magazine 5 to a connection with the spring catch 22 of the reel 6, when the kinetoscope is operated the revolving shaft 8 acts through the engaging gears 11 and 14, the shaft 13, the engaging gears 15 and 20, the frictional clutching disk 18 and the shaft 19, whereby the reel 6 is revolved and the film wound thereon. As the roll of film gradually increases in size, the tension of the film causes the disk 18 to slip or lag relatively to the gear 20, so that while the kinetoscope may be operated at a constant rate the takeup reel is permitted to revolve at a gradually diminishing rate as the size of the roll thereon increases.

The kinetoscope 2 is held on the table 1, by the journal 23 with the nut 24 thereon, so that the optical direction can be altered, the kinetoscope being adapted to turn through the desired limited arc. The bearing 12 may be rendered adjustable, to the limited extent required for accommodating the positions of the gears 14 and 15 to the gears 11 and 20, by forming a ball 25 thereon and providing a socket bearing 26 in which the ball can be moved to effect such adjustment, the ball being held in the desired position by set screw 27 and the socket bearing secured to the under side of the table. The part 26 has in the plate 28 thereof the holes 29, larger than the bolts 30 by which it is fastened to the table, so that the socket bearing can be adjusted.

Having described my invention, I claim:

1. A kinetoscope having means comprising a revoluble shaft for feeding a film, a table by which said kinetoscope is supported, a magazine supported by said table, a reel in said magazine, a revoluble shaft on which said reel is mounted, a bearing fixed to said table, a shaft journaled in said bearing, engaging gears connecting said first and third named shafts, and engaging gears connecting said second and third named shafts.

2. A kinetoscope having means comprising a revoluble sprocket shaft for feeding a film, a second revoluble shaft, engaging gears on the respective shafts, a table, a bearing supported by said table, said second shaft being journaled in said bearing, a revoluble reel for winding said film, means supported by said table for supporting said reel, a second gear fixed on said second named shaft, and mechanism engaging said gear last named and a clutching device for revolving said reel.

3. A kinetoscope having a gear connected therewith, a reel having a gear connected therewith, a table for supporting said parts, a bearing supported by said table, a second bearing having an adjustable connection with said bearing first named, a shaft journaled in said second bearing, and gears fixed on said shaft, said gears engaging the respective gears of said kinetoscope and reel.

In witness whereof I have hereunto set my name this 18th day of February, 1909, in the presence of the subscribing witnesses.

JESSE B. JOHNSON.

Witnesses:
ROBERT JAMES EARLEY,
Jos. G. DENNY, Jr.